Jan. 4, 1944.  J. MALCZEWSKI  2,338,449
DEVICE FOR CONTROLLING MULTIPLE SHUTTERS
Filed Sept. 26, 1941  2 Sheets-Sheet 2
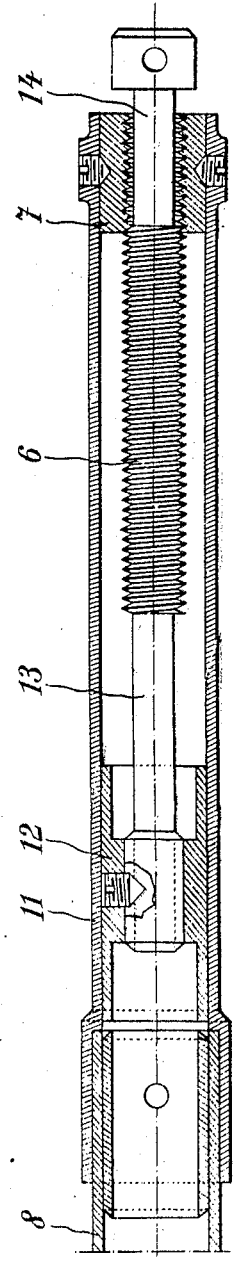
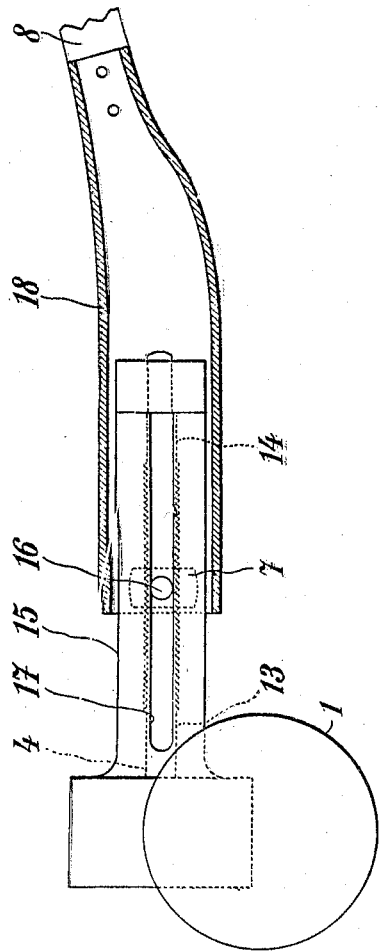
INVENTOR
JÉREMI MALCZEWSKI,
BY Robert B Larson
ATTORNEY Patented Jan. 4, 1944

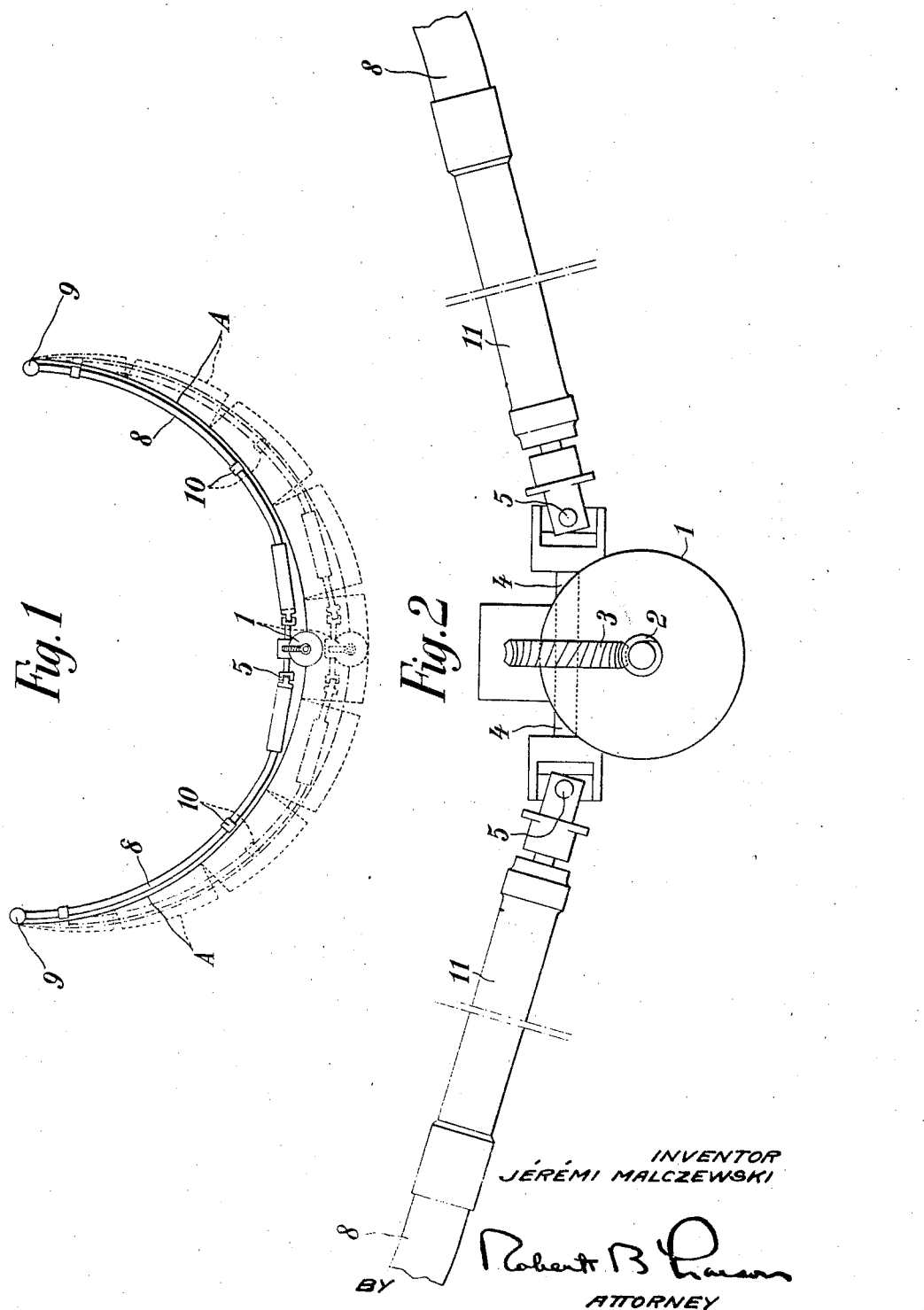

2,338,449

UNITED STATES PATENT OFFICE 2,338,449

DEVICE FOR CONTROLLING MULTIPLE SHUTTERS

Jérémi Malczewski, Lyon, France; vested in the Alien Property Custodian

Application September 26, 1941, Serial No. 412,526
In France November 8, 1939

7 Claims. (Cl. 268—96)

The present invention relates to devices for controlling multiple shutters, and more specifically to those utilized in regulating the flow of cooling air into the hoods of engines, especially aircraft engines. These shutters may be mounted for example along a portion of the periphery of the hoods in such manner that the opening thereof may take place in the manner of a fan-like spreading, or, in a more general manner, by the relative displacement of the respective shutters away from one another.

The object of the present invention is to provide a control device of this kind which is better adapted to meet the requirements of practice, in particular, from the point of view of the facility of operation thereof and of the simplicity of its mounting.

With this object in view, according to an essential feature of the present invention, the device includes at least one electric motor, preferably mounted in close proximity to the shutters and capable of producing the displacement thereof away from one another, or, on the contrary, their movement toward one another, through a suitable kinematic system.

According to another feature of the present invention, the device in question includes an irreversible kinematic system, for instance of the jack type, preferably operated by an electric motor according to the feature just above mentioned, the whole being combined in such manner as to permit movement of the shutters into any desired position.

Other features of the present invention will result from the following detailed description of some specific embodiments thereof.

Preferred embodiments of the present invention will be hereinafter described, with reference to the accompanying drawings, given merely by way of example, and in which:

Fig. 1 is a diagrammatic elevational view of a system of adjustable shutters for an airplane engine hood, provided with a control device made according to the invention.

Fig. 2 shows in elevation, a part of the control device, on an enlarged scale.

Fig. 3 is a detail view showing, in section, some of the parts of this device, made according to an embodiment of the invention.

Fig. 4 is a view, analogous to Fig. 3, showing another embodiment.

As above stated, the device according to the invention is intended to control the adjustment of a system of movable shutters intended to vary the flow of the cooling air, in an internal combustion engine, and especially an airplane engine.

Concerning the shutters themselves, which are diagrammatically shown at A on the drawings, they are made in any suitable known manner. For example, they may be pivoted to the corresponding edge of the hood or hood portion that corresponds with the shutters. They may also be secured to this wall of the hood, their own elasticity then acting as an articulation, as set forth in the French Patent No. 829,451, filed by me on Nov. 18, 1937.

In Fig. 1 of the drawings, I have shown shutters which extend over 180° of a hood of circular section, such an arrangement being given merely by way of example.

Concerning now the means for producing the opening or the closing of this system of shutters, said means include, according to the invention, at least one electric motor, adapted to run in both directions, mounted in close proximity to the parts to be controlled, and this motor is arranged to act on a kinematic system capable of bringing the shutters away from, or toward, one another.

In order to obtain this result, it is advantageous, according to a preferred embodiment of the invention, to have the whole of the control device carried by the shutters themselves. For instance, the motor 1 itself is carried by the middle shutter, as shown by Fig. 1. Such an arrangement permits of reducing to a minimum the room occupied by the device in the annular space through which air is escaping.

As for the kinematic system through which the motor acts on the shutters, it is advantageously made in such manner that it is irreversible, so as to permit of ensuring the stability of the whole, in any position whatever thereof.

In the embodiment illustrated by the drawings, the system includes one or several bolt-and-nut units, adapted themselves to act on movable or deformable parts capable of producing the desired relative movements of the respective shutters.

In the drawings (Figs. 1 to 3), there is shown a device including a motor 1, preferably fitted with a speed reducing gear 3, 2, arranged to drive spindles 4, 4. These spindles in turn drive, through Cardan joints, designated by 5, threaded rods 6 coacting with nuts 7. These nuts control the displacements of two curved tubes or rods 8, pivotally mounted at 9, which are connected to the respective shutters, or at least to some of them, through lugs such as 10, in which said tubes 8 are slidable.

It will be readily understood that, provided that lugs 10 are mounted at a suitable distance from the axis about which each of the shutters can move with respect to the fixed wall of the hood, the movements of tubes 8 away from, or toward, each other (which movements are produced by the relative displacements of the screw and the nut) will have for their effect to spread out, or on the contrary, to gather, the shutters.

Fig. 1 diagrammatically shows these two positions, the first in dotted lines, the second in solid lines.

It should be well understood that, in the known manner, the respective shutters may remain in bearing contact with one another, in the course of their spreading movement, and this through any suitable means.

The motor and its speed reducing gear will be mounted in cases.

In Fig. 3, I have shown details of the screw-and-nut system, according to an embodiment of the invention.

In this example, nut 7 is rigid with a sleeve 11, itself fixed to the corresponding end of tube 8. A sliding member 12 is adapted to move in the sleeve, in such manner as to guide threaded rod 6 therein.

Preferably, this threaded rod is prolonged on both sides by smooth portions 13 and 14, in such manner as to make it possible for the motor to keep running without interference, after full opening or closing of the system has been obtained.

In Fig. 4, I have shown a modification according to which the screw and nut units are mounted directly on spindles 4, on the inside of sleeves 15 which constitute extensions of the casings of the motor unit.

Each of the nuts 7 controls, through lugs 16 extending through slots 17 provided in sleeves 15, a tubular extension 18 provided on the corresponding tube 8, this tubular element 18 being made of suitable diameter for permitting its relative movements with respect to sleeve 15.

This arrangement makes it possible to dispense with the Cardan joints, but of course other arrangements would permit of obtaining the same result.

Anyway, whatever be the particular mechanical arrangement that is chosen, I obtain a device the operation of which results clearly from the preceding explanation making it unnecessary to enter into a further discussion thereof. This device has, over those used for the same purpose up to the present time, many advantages, the most interesting of which are the following:

Any operation of the device can be performed in the minimum time;

A stable position of all the parts of the system can be ensured, which could not be obtained, without special means for this purpose, with existing control devices, as well mechanical as pneumatic or again as hydraulic;

Consequently, it is possible to bring and to keep the shutters, in any intermediate position, merely by starting and stopping, through any suitable means, at a given time, the electric motor which drives the whole system.

Of course, this motor will be fitted with all circuits of a known type which permit of reversing its direction of working, the whole being controlled from an instrument board carried by the airplane.

The stopping of the motor, at the end of the total displacement of the device, can be automatically controlled by the shutters themselves or in any other way.

Eventually also, any repeating or other suitable means may be provided for enabling the pilot to know, at any time, what is the exact position of the shutters (especially when they occupy an intermediate position).

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In connection with an adjustable system of multiple shutters, a device for controlling said shutter system which comprises, in combination, at least one electric motor carried by one of said shutters, and kinematic means, of the irreversible type, interposed between said motor and said shutters, for causing said shutters to move away from, or toward, one another, in response to a given working of said motor in one direction or the other.

2. In connection with an adjustable system of multiple shutters mounted on a support, a device for controlling said shutter system which comprises, in combination, at least one electric motor carried by one of said shutters, and a kinematic system of variable length movably fixed at one end to said motor and at the other end to said support operatively connected with at least some of said shutters, said kinematic system being adapted to have its length increased or decreased by the working of said motor in one direction or the other.

3. In connection with an adjustable system of multiple shutters mounted on a support, a device for controlling said shutter system which comprises, in combination, at least one electric motor carried by one of said shutters, and an irreversible kinematic system of variable length movably fixed at one end to said motor and at the other end to said support and operatively connected with at least some of said shutters, said kinematic system being coupled with said motor in such manner as to have its length increased or decreased by by the working of said motor in one direction or the other.

4. In connection with an adjustable system of multiple shutters mounted on a support, a device for controlling said shutter system which comprises, in combination, at least one electric motor carried by one of said shutters, a deformable tube movably fixed at one end to said support, and operatively connected with at least some of said shutters, a spindle driven by said motor, and a screw and nut connection between said spindle and the other end of said tube, whereby the working of the motor in one direction or the other causes the total length of the kinematic system constituted by said tube and said spindle to increase or decrease according as said motor is running in one direction or the other.

5. In connection with an adjustable system of multiple shutters mounted on a support, a device for controlling said shutter system which comprises, in combination, at least one electric motor carried by one of said shutters, a deformable tube movably fixed at one end to said support and operatively connected with at least some of said shutters, a spindle driven by said motor, and a screw-and-nut connection between said spindle and the other end of said tube, whereby the working of the motor in one direction or the other causes the total length of the kinematic system constituted by said tube and said spindle to increase or decrease according as said motor is running in one direction or the other, a universal joint being included in said kinematic system.

6. A device according to claim 5 in which said universal joint consists of a Cardan joint interposed between said motor and said spindle.

7. A device according to claim 5 in which said universal joint is interposed between said nut and the enlarged end of said tube.

JÉRÉMI MALCZEWSKI.